United States Patent [19]
Müller-Mach et al.

[11] Patent Number: 5,451,340
[45] Date of Patent: Sep. 19, 1995

[54] INFRARED EMISSIVE THIN FILM ELECTROLUMINESCENT MATERIAL

[75] Inventors: Regina Müller-Mach; Gerd O. Müller, both of Berlin, Germany

[73] Assignee: Westinghouse Electric Corporation, Pittsburgh, Pa.

[21] Appl. No.: 169,266

[22] Filed: Dec. 20, 1993

[51] Int. Cl.$^6$ ............... C09K 11/54; C09K 11/56; C09K 11/57
[52] U.S. Cl. .............................. 252/301.6 S
[58] Field of Search ................... 252/301.6 S

[56] References Cited
U.S. PATENT DOCUMENTS
3,260,879  7/1966  Fever .................... 252/301.6 S

OTHER PUBLICATIONS

Joshi et al., "Appl. Phys. Lett.", 47(10), 1985, pp. 1108–1109, no month.
Busse et al., "J. of Lumin", 31&32, (1986), pp. 421–423, no month.
Goede et al., "Chem. Abstr.", vol. 101, 1984, 100615b, no month.
Tauson et al., "Chem. Abstr.", vol. 87, 1977, 138660t, no month.

*Primary Examiner*—Mark L. Bell
*Assistant Examiner*—C. M. Bonner

[57] ABSTRACT

An electroluminescent composition of zinc sulfide containing manganese in an amount of about 10 to 50 mol percent and exhibiting a substantial infrared emission at greater than 700 nanometers wavelength.

3 Claims, 1 Drawing Sheet

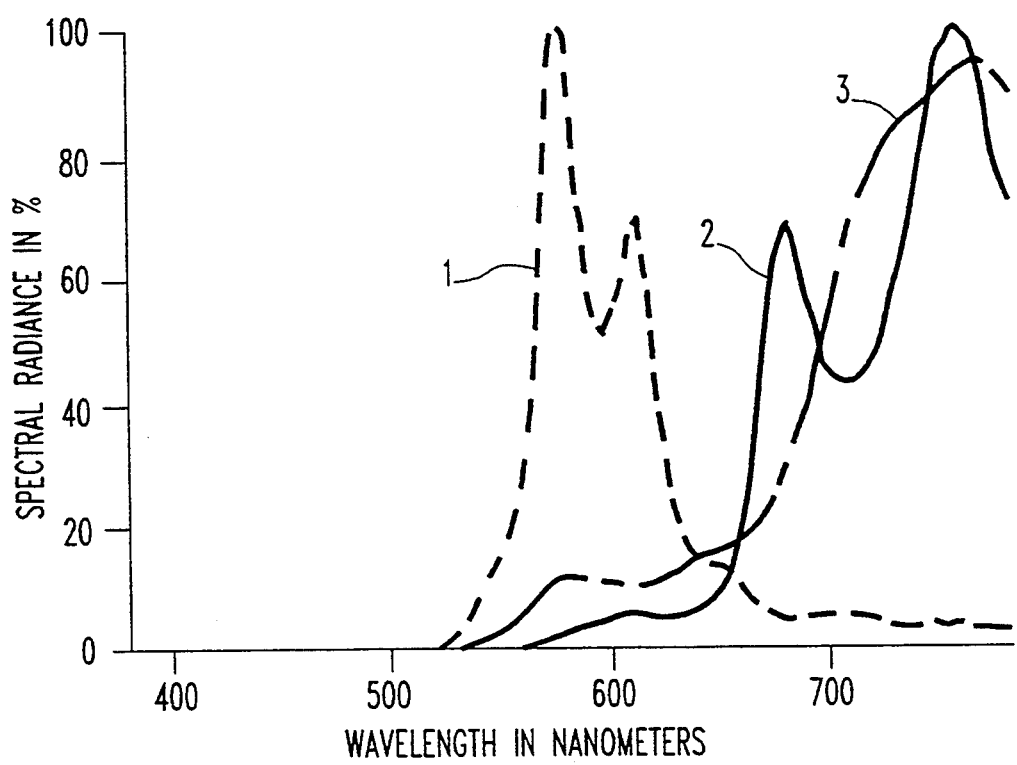

INFRARED EMISSIVE THIN FILM ELECTROLUMINESCENT MATERIAL

BACKGROUND OF THE INVENTION

1. Field of the Invention

This invention relates to electoluminescent materials and in particular to infrared emmissive materials. This material can be fabricated as a thin film which may be used as an efficient source of infrared radiation or in special display applications.

2. Description of the Prior Art

Electroluminescent compositions produce characteristic emission upon application of a voltage across the layer or thin film of the composition with current passing through the layer or film. Such compositions typically have produced visible emission and have found use in flat panel displays. A more recent application of electroluminescent compositions are in thin film devices of the edge emitter type where the emitted light is directed out of the edge of the thin film as a light source.

A well known thin film electroluminescent material is zinc sulfide containing manganese dopant in an amount of from about 0.1 mol percent to about 4 mol percent. This well known material has been used in thin film electroluminescent {TFEL} displays as seen in U.S. Pat. No. 4,006,383, and more recently in edge emitting optical radiation sources as seen in U.S. Pat. No. 4,535,341.

The prior art zinc sulfide doped with manganese exhibits a characteristic emission with a broad band centered at 590 nanometers and extending from about 530 to 640 nanometers when the thin film is subject to a drive voltage across the film.

In certain applications for thin film edge emitter light sources it is desired to produce infrared emission. This is because in many printer applications an infrared laser is currently used to actuate infrared sensitive photoreceptors, which are particularly sensitive at about 780 nanometers in the infrared.

SUMMARY OF THE INVENTION

An infrared emissive electroluminescent composition has been discovered of zinc sulfide containing about 10 to 50 mol percent of manganese. This material exhibits substantial emission at greater than 700 nanometers, and with a peak emission at about 780 nanometers for a composition which includes manganese in an amount of 40 mol percent.

BRIEF DESCRIPTION OF THE DRAWINGS

The sole drawing is a plot of the spectral radiance of the output spectral radiance on a scale of 0–100 percent for two samples of compositions of the present invention, and for a prior art composition plotted against wavelength of the emission in nanometers.

DESCRIPTION OF THE PREFERRED EMBODIMENT

It has been discovered that zinc sulfide electroluminescent compositions with high concentrations of manganese, from about 10 to 50 mol percent, exhibit substantial emission in the infrared at greater than about 700 nanometers wavelength. The composition can be prepared by conventional thin film phosphor preparation techniques.

The sole FIGURE illustrates the output spectral emission of the prior art 3 mol percent manganese doped zinc sulfide material in curve 1. The emission for a composition of the present invention is seen in curve 2, which is an embodiment containing 12 mol percent of manganese. Another embodiment of the present invention is exemplified in curve 3, which shows the emission of a 40 mol percent manganese zinc sulfide composition with a peak emission at about 780 nanometers in the infrared.

The preferred embodiment of the invention is a composition containing about 25 mol percent manganese content, which composition exhibits the highest luminescent efficiency of the tested compositions.

The electroluminescent compositions of the present invention exhibit good luminescent efficiencies of above 100 microwatts per watt of applied power. A radiative decay time of less than about 10 micro-second has been indicated from testing with very short voltage pulses with the luminance following the current decay without delay. The exact nature of the configuration of the luminescent center for the highly manganese doped compositions of the present invention is not presently known. This new composition can be characterized as a zinc-manganese sulfide doped with manganese or possibly as zinc sulfide doped with manganese sulfide and manganese.

A major advantage of the composition of the present invention is that the infrared emission matches the spectral sensitivity of common photoreceptors for printers. Furthermore, the rapid emission decay will permit rapid printing rates.

The composition of the present invention can be prepared in a thin film upon a transmissive substrate and finds application in an edge emitter device as seen in the aforementioned U.S. Pat. No. 4,535,341. This thin film can be fabricated by vacuum deposition using thermal or electron beam evaporation, by rf-sputtering, by chemical vapor deposition, or other conventional methods of producing thin film luminescent compositions.

We claim:

1. A luminescent composition of zinc sulfide doped with manganese, said composition having a total of about 10 to 50 mol percent of manganese.

2. An electroluminescent composition of zinc sulfide doped with manganese, said composition containing manganese in an amount of about 10 to 50 mol percent of the zinc and exhibiting a substantial peak infrared emission at greater than 700 nanometers.

3. The electroluminescent composition set forth in claim 2, wherein the manganese content is about 25 mol percent and the infrared emission peaks at about 780 nanometers.

* * * * *